2,902,462
POLYESTER OF A MIXTURE OF ISOMERIC C$_{10}$ DICARBOXYLIC ACIDS AND PROCESS OF MAKING

Harry Greenberg and Raymond W. Horst, Cincinnati, Ohio, assignors to National Distillers and Chemical Corporation, New York, N.Y., a corporation of Virginia No Drawing. Application July 22, 1955
Serial No. 523,925

7 Claims. (Cl. 260—45.4)

The present invention relates broadly to a novel class of synthetic polyester products from selected branched chain diacids and more particularly, it relates to such polyesters which are further modified with other organic materials to yield highly useful derivatives thereof.

It is an object of this invention to provide a novel class of modified polyesters and derivatives thereof having highly useful properties and of value in the fields of synthetic rubbers, resins, laminated materials and others.

A further object of this invention is to provide novel compositions of resinous and rubbery materials comprising and/or having incorporated therein the polyester derivatives prepared from selected branched chain C$_{10}$ diacids.

Still another object of this invention is to provide novel polyester derivatives in which the polyester component is prepared by use of a mixture of acidic reactants believed to be novel for use in preparation of polyester products. Still other objects of the invention will be apparent from the description thereof as set forth hereinafter.

It has been found that valuable polyesters can be obtained by esterification and transesterification reactions using isomeric, branched chain C$_{10}$ aliphatic diacids and mixtures containing substantial amounts of such branched chain diacids, and especially a mixture of such C$_{10}$ diacids made up from and including substantial amounts of α-ethylsuberic and α,α'-diethyladipic acids.

It has now been further discovered that novel and useful derivatives of these polyesters can be prepared by suitable reactions and treatments thereof. The polyesters themselves are prepared by esterification and transesterification reactions using isomeric, branched chain C$_{10}$ aliphatic diacids and mixtures containing substantial amounts of such branched chain diacids, and especially a mixture of such C$_{10}$ diacids made up from and including substantial amounts of α-ethylsuberic and α,α'-diethyladipic acids that is, C$_{10}$ diacids having at least one C$_2$ side chain per molecule. These branched chain C$_{10}$ diacids and mixtures thereof are preferably but not necessarily obtained as a mixture and by a particular method as further described below.

It has recently been found that an aliphatic conjugated diolefin can be treated with finely dispersed sodium or potassium in a selected ether medium and in the presence of a relatively small amount of polycyclic aromatic hydrocarbon and/or a solid attrition agent at a temperature preferably below 0° C. to give a mixture of dimetallo derivatives of the dimerized diolefin. These dimetallo derivatives can then be carbonated at a temperature below 0° C. to give the corresponding salts of dicarboxylic acids in high yields and selectivities.

In the case of the initial reaction using sodium and butadiene, the product obtained comprises the disodium derivatives of the aliphatic isomeric octadienes. Studies of the structures of the saturated diacids arising therefrom after carbonation and hydrogenation indicates that mixtures of isomeric C$_{10}$ dicarboxylic acids are obtained. Thus, following final hydrogenation and acidification, the product mixture yields sebacic acid, α-ethylsuberic acid, and α,α'-diethyladipic acid, together with small amounts of other acids including monobasic carboxylic acids.

In the preferred type of operation, the butadiene and finely dispersed sodium are reacted in an attrition apparatus such as a ball mill or pebble mill, with a selected solid attrition agent. This material is most conveniently solid sodium chloride or sodium sulfate. The disodiooctadienes formed are subsequently carbonated to the unsaturated C$_{10}$ diacids. Organic solvents are then removed and the solids are converted to an aqueous solution, which is preferably filtered prior to hydrogenation. A catalytic hydrogenation is then carried out to convert all acidic compounds to completely saturated acids.

The resulting final reaction mixture contains varying amounts of sodium salts of isomeric C$_{10}$ dicarboxylic acids. It also contains the valuable branched chain C$_{10}$ acids as well as small amounts of monobasic acids of varying molecular weights from C$_5$ to C$_{13}$.

The major portions of the linear isomer, sebacic acid, can be separated from this mixture for instance, by saturation of the solution with sodium chloride and addition of controlled amounts of a strong acid. Benzene extraction can also be used. This produces an isomeric mixture of C$_{10}$ aliphatic dicarboxylic acids containing from 60–90% α-ethylsuberic acid, 10–25% of α,α'-diethyladipic acid, and the remainder 0–15%, substantially sebacic acid. Generally, the initial polyester products are prepared by subjecting a suitable glycol and the appropriate C$_{10}$ acidic reactants to esterification or transesterification reaction conditions with elimination of water or other by-product formed by the esterification reactions.

For instance, the polyesters useful for the herein described purposes of producing modified polyesters can be prepared by conventional esterification methods, with or without a catalyst. The preferred method of polyester synthesis involves refluxing the mixed isomeric diacids and the selected glycol or glycols with or without a diluent such as an inert solvent suitable for lowering the reflux temperature. The resulting polyester product is then washed in the usual manner to remove any residual acid and dried over a drying agent. Alternatively, the initially desired polyester may be made by ester interchange from the corresponding dimethyl or diethyl esters, although this is somewhat less satisfactory.

The condensation of the glycols with the acidic reactant may be accomplished by heating the reactants, preferably at 100–250° C., or higher, with or without a reaction diluent. Use of a slight excess of glycol is preferred to insure that little or no acidic component remains in the final ester product. For relatively non-acidic products, the terminal groups will be predominantly alcoholic hydroxyl groups. During the reaction, the water by-product that is formed should be removed from the reacting mixture by distillation in order to insure completion of the esterification reaction.

In preparation of the initial polyester products, any of a wide variety of glycols may be employed, including saturated and unsaturated aliphatic glycols that may include a wide range of carbon atom content. Thus glycols useful for preparation of the polyesters include ethylene glycol, diethylene glycol, 1,2-propylene glycol, 1,3-butylene glycol, 1,6-hexanediol, octamethylene glycol, dodecamethylene glycol, 2-ethyl-1,8-octanediol, 3-ethyl-1,10-decanediol, 3,6-diethyl-1,8-octanediol, 4,7-diethyl-2,9-decanediol, 3,13-tetradecanediol, and others as well as mixtures thereof.

There is used for ester formation with the glycol, an acidic reactant or preferably a mixture of reactants which contain branched chain $C_{10}$ aliphatic dibasic acids, having at least one $C_2$ branch per molecule. Thus, these novel polyesters are characterized by containing a plurality of units of the following structure:

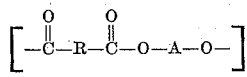

wherein R is one hydrocarbon portion of a $C_{10}$ saturated aliphatic diacid and A is the hydrocarbon portion of a glycol; said polyesters being further characterized in that the major proportion of such units in the polyester is such that R is the hydrocarbon portion of a $C_{10}$ saturated aliphatic diacid containing at least one $C_2$ branch chain.

These polymeric polyesters can be modified by chain-length extension and/or crosslinking with diisocyanates to yield rubber-like products. If unsaturation exists in the polyester, either in the residue from the dibasic acid or mixture of dibasic acids used or in the residue from the glycol used, the possibility of crosslinking with vinyl compounds, such as styrene, and the like, permits the preparation of additional compositions of matter such as hard infusible plastic materials whose many desirable properties have caused them to be used in ever increasing numbers and various types of applications.

Thus, the mixtures of $C_{10}$ dibasic acids and dibasic acids containing unsaturation can be esterified with either saturated or unsaturated glycols to yield polyesters and copolyesters having unsaturation in the molecule. These unsaturated products can be modified with diisocyanates, with vinyl monomers or with both to give new compositions of matter. These diisocyanate cured materials lead to a variety of sofe to hard rubber-like materials. Those which have been crosslinked with vinyl monomers as, for instance, styrene, give hard, glass-like infusible resins which may be used in casting, laminating or "potting" applications.

As a result of the type and amounts of reactants employed in their formation, the polyesters as embodied herein may contain active terminal groups which are either carboxyl or hydroxyl groups depending upon whether an acid or a glycol was the last compound to react in the formation of the molecule. The esters described herein may then be lengthened by controlled reaction between such active terminal groups and other reagents. Generally, the polyester is lengthened further by reaction between such hydrogen-bearing terminal groups and a bifunctional material which is reactive therewith, as for example, an organic diisocyanate. The resulting formation of linkages between the diisocyanate groups and the terminal groups of the polyester produce a chain extended polymer. In instances wherein there is a terminal hydroxyl group, reaction with the diisocyanate results in a urethane linkage whereas, in the case of terminal carboxyl groups, the resulting linkage is amidic. In either case, the urethane linkage and amide linkage have available hydrogen atoms for reaction with an additional bifunctional material, such as a diisocyanate and, by reaction of the available hydrogen atoms therewith, it is possible to crosslink the chain extended polymer at various points along its chain.

The degree and state of polymerization of the polyesters prepared as embodied herein may be conveniently determined by analysis for the average number of carboxyl and hydroxyl groups in a given amount of the polyester. The acid number is a measure of the number of terminal carboxyl groups, and the hydroxyl number is a measure of the number of terminal hydroxyl groups. The sum of the carboxyl and hydroxyl numbers indicates the reaction number, i.e., the average number of reactive terminal groups, present in the polyester product which, in turn, is an indication of the degree of polymerization.

When the initial ester products are to be converted into diisocyanate-modified products, the polyesters must be substantially anhydrous. This can be accomplished by heating or by introduction of inert gases or some inert drying agent. The polyesters preferred for further reaction, such as with diisocyanates, should have a reactive number of up to about 100 and, preferably, from about 40 to about 60. For converting the polyesters into the diisocyanate modified products, the diisocyanates are preferably used in excess over the polyester terminal hydroxyl groups or carboxyl groups in the polyesters. Generally, an excess of 20 to 100% is adequate. Any of a variety of diisocyanates may be used, including both aliphatic types such as hexamethylene diisocyanate, octamethylene diisocyanate, and decamethylene diisocyanate, and aromatic types such as naphthelene-1,5-diisocyanate, 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, p-phenylene diisocyanate, and others.

Also embodied herein are the polyesters modified with diisocyanates as aforedescribed and these products further modified by interaction with other additives, particularly bifunctional organic materials. It is possible to react such further modifying materials either simultaneously with, or subsequent to, the reaction between the polyesters and diisocyanates. Such other bifunctional additives may be of the types that contain two groups each having an active available hydrogen. The bivalent radical to which they are attached can be either aliphatic or aromatic. Compounds which are useful for such a purpose include diamines, dibasic carboxylic acids, amino acids, hydroxy acids, and amino alcohols, as well as certain ureas and substituted ureas. Diamines and diacids have been found to be particularly suitable for such usage. Such further modification of the diisocyanate-modified polyesters results in further crosslinking of the macromolecules and formation of a rubber-like state as, in general, the amount of bifunctional additives employed is less than, or equal to, the amount equivalent to the excess of isocyanate groups in the polymers.

Diisocyanate-modified polyesters as embodied herein may be prepared as elastomeric products, as tough resins, infusible resins, and the like, depending on the particular reactants employed. As to the elastomeric products, they may be used in cured or uncured state for many requirements wherein elasticity, resistance to chemicals, resistance to swelling, etc. is desired.

Such acids, or mixtures thereof, may be used as the sole acidic reactant for polyester formation with the glycol or mixtures of glycols, or, as is illustrated hereinafter, the acidic reactant may comprise, in addition to the branched chain $C_{10}$ dicarboxylic acids, another acid or mixture of acids, whereby the resulting ester product comprises a copolyester of said $C_{10}$ diacids and said other acid. For such usage, the other acid may be any of a wide variety of dibasic acids, or their anhydrides, including succinic acid, adipic acid, methyladipic acid, fumaric acid, maleic acid, malic acid, dihydromuconic acid, azelaic acid, sebacic acid, suberic acid, phthalic acid, terephthalic acid, and others. For preparation of unsaturated polyesters, maleic anhydride is particularly suitable for use as a component of the acidic reactant. Additionally, monobasic acids may be included in the acidic reactant in certain instances and, particularly as chain stopping agents when it is desired to control the extent of polymerization of the polyesters formed by esterification reaction between a suitable glycol and the diacidic reactants. For such a purpose, suitable acids include acetic acid, propionic acid, butyric acid, isobutyric acid, valeric acid, pelargonic acid, and higher monocarboxylic acids.

In preparation of the products embodied herein, mixtures of various of the glycols and acids, in addition to the branched chain $C_{10}$ acid component, can also be used, the resulting products being mixed polyesters.

In the preparation of ester products as embodied herein, and in which, unsaturation exists due to use of an unsaturated glycol, or unsaturated acid, or both, the unsaturated ester product may be dissolved in styrene or other suitable vinyl aromatic compound which serves as a solvent as well as a reactant. By dissolving the unsaturated ester product in a vinyl aromatic such as styrene, diallylphthalate, triallyl cyanurate, and the like, handling of the ester product is facilitated while, at the same time, providing a composition that is curable to highly desirable properties whereby they are useful as structural materials, as low temperature molding or embedding ("potting") materials, for preparation of glass fiber reinforced products such as translucent sheets, panels, etc., boat hulls, fishing rods, and the like.

In the polymerization of unsaturated polyester-styrene mixtures to fully cured materials, a catalyst is generally employed. Useful therefor are free radical initiators such as peroxides and azo compounds. Many compounds of the peroxide type are available for such a purpose and choice of a particular peroxide depends upon several factors. The acyl peroxides such as benzoyl peroxide can be used as well as aldehyde or ketone peroxides, for example, methyl ethyl ketone peroxide or cyclohexanone peroxide. Cumene peroxide is also useful as a catalyst. It has been found to be convenient to disperse the peroxide catalyst into inert liquids such as dimethylphthalate or tricresyl phosphate before addition to the unsaturated polyesters. The amount of catalyst that will produce satisfactorily cured resins having optimum characteristics depends on many factors, including the type of resin, desired speed of cure, etc. In general, from 0.1 to 2.0% of peroxide is sufficient, although somewhat higher concentrations are usually required for their laminates.

For the polymerization, suitable promoters and activators may be used to alter the so-called induction period, i.e., the time required for gelation, and the cure time, which is the time required for the resin to become fully cured. Cobalt naphthenate is typical of such an activator although certain amines may be used for such a purpose.

The following examples are presented to illustrate the present invention, though it is to be understood that the invention is not limited thereto and that certain modifications or variations thereof are possible without departing from the spirit of the invention or from the scope of the appended claims. It will be understood that all quantitative proportions referred to are expressed on a weight basis, unless expressly indicated otherwise.

Example 1

A mixture of dibasic acids, 202 parts, consisting approximately of 5% sebacic acid, 25% $\alpha,\alpha'$-diethyladipic acid, and 70% $\alpha$-ethylsuberic acid was introduced into a three-necked reactor fitted with a stirrer, thermometer, gas inlet tube, distilling head and condenser. To the acid was added (127 parts) diethylene glycol. The molar ratio of dibasic acid to glycol was 1:1.2. Carbon dioxide gas was bubbled through the mixture throughout the esterification. The reaction was accomplished by raising the temperature to 165–200° C. until almost all the water was distilled away. The temperature was then raised gradually to 220° C. and the pressure gradually reduced to 10 mm. Hg. After 10 hours, a golden yellow, very viscous product was obtained. Determinations showed the acid number to be 23.2 and the hydroxyl number to be 23.0. This polyester product is useful as polymeric polyester as such and can all be employed for conversion to modified polyester products which as such are also highly useful.

Example 2

To 500 parts of the polyester mixture of dibasic acids and diethylene glycol from Example 1 was added 61 parts of 1,8-octamethylene diisocyanate meanwhile maintaining stirring to blend the reactants. The mixture was poured into a shallow glass pan and baked for 24 hours at 130° C. The surface of this pan had been pretreated with silicone to prevent sticking. The resulting modified polyester polymer was a soft rubber-like material.

Example 3

To 500 parts of the polyester described above as prepared in Example 1, 65 parts of the mixed isomers of tolylene diisocyanate was added with stirring. The mixture was baked at 125–130° C. for 24 hours giving a clear brown rubbery product which showed 200% stretch before break.

Example 4

To a mixture of dibasic acids (202 parts) consisting approximately of 5% sebacic acid, 25% $\alpha,\alpha'$-diethyladipic acid and 70% $\alpha$-ethylsuberic acid was added 58 parts of maleic acid. This mixture of acids was placed in a 3-necked reactor fitted with stirrer, thermometer, gas inlet tube ($CO_2$), distilling head and condenser. To the mixture of acids was added 254 parts of diethylene glycol. The molar ratio of dibasic acids to glycol was 1:1.2.

Carbon dioxide was bubbled through the mixture through the esterification. The reaction began at 170° C., when the evolution of water was observed in the condenser. Over a period of eight hours the temperature was slowly raised to 225° C. during the last four hours of which a vacuum of 10 mm. Hg was maintained. The acid number at completion was 35.0 and the hydroxyl number 22.0. This polyester is a light yellow very viscous polymer which can be employed for the conversion to modified polyester products.

Example 5

The polyester from Example 4 (100 parts) was dissolved in 42.8 parts of styrene monomer at room temperature to give a varnish containing 70% polyester content. The addition of 1% benzoyl peroxide catalyst to this varnish followed by the application of heat (105° C.) in suitable molds for 10 minutes resulted in the formation of hard infusible glass-like product.

Example 6

A mat formed from 10 layers of glass wool treated with the benzoyl peroxide-polyester-styrene composition (from Example 5), in such a manner that the glass wool constituted 40% by weight of the mat was heated for several minutes between steam heated plattens at 30 p.s.i. pressure. The resultant glass reinforced laminate showed excellent light transmittancy and improved mechanical strength over the styrene-modified resin containing no glass fibers.

Example 7

The copolyester prepared in Example 4 was blended with 1,8-octamethylene diisocyanate in the ratio of 50:6 parts by weight. The mixture was cured at 125° C. for 24 hours in shallow pans. The resultant polymer was a tough rubbery product insoluble in alcohol, benzene and acetone and exhibiting good stretch without deformation.

What is claimed is:

1. A diisocyanate modified polyester condensation product of an organic aliphatic glycol and a dicarboxylic acid mixture comprising 60–90% $\alpha$-ethylsuberic acid, 10–25% $\alpha,\alpha'$-diethyladipic acid and the remainder, up to 15%, sebacic acid, said diisocyanate modified product being characterized by having the terminal groups of the polyester chain extended by a diisocyanate.

2. An organic diisocyanate modified polyester condensation product of an organic aliphatic glycol and an isomeric mixture of $C_{10}$ aliphatic dicarboxylic acids comprising 60–90% $\alpha$-ethylsuberic acid, 10–25% of $\alpha,\alpha'$-diethyladipic acid and the remainder, up to 15% sebacic acid.

3. An organic diisocyanate modified polyester condensation product, as defined in claim 2, further modified by reaction with an organic bifunctional compound having two groups each of which has at least one active hydrogen, said bifunctional compound being selected from the group consisting of diamines, dibasic carboxylic acids, amino acids, hydroxy acids, amino alcohols, urea and substituted ureas.

4. An unsaturated copolyester of an organic aliphatic glycol and a dicarboxylic acid reactant comprising (1) an ethylenically unsaturated dicarboxylic acid and (2) an isomeric mixture of $C_{10}$ aliphatic dicarboxylic acids comprising 60–90% α-ethylsuberic acid, 10–25% of α,α'-diethyladipic acid and the remainder up to 15% sebacic acid.

5. A polymerizable composition consisting substantially of an unsaturated copolyester, as defined in claim 4, and a vinyl aromatic compound from the group consisting of styrene, diallyl phthalate and triallyl cyanurate.

6. A process which comprises reacting a polyester of an organic aliphatic glycol and a dicarboxylic acid reactant comprising a mixture of 60–90% α-ethylsuberic acid, 10–25% of α,α'-diethyladipic acid, and the remainder, up to 15%, sebacic acid, with an organic diisocyanate in at least stoichiometric amounts to react with the total number of terminal carboxyl and hydroxyl groups in said polyester, to produce a diisocyanate modified product of said polyester.

7. A process which comprises reacting a mixture of an aliphatic glycol, an ethylenically unsaturated dicarboxylic acid, and a mixture of $C_{10}$ aliphatic dicarboxylic acids comprising 60–90% α-ethylsuberic acid, 10–25% α,α'-diethyladipic acid, and the remainder, up to 15% sebacic acid to produce an unsaturated copolyester.

References Cited in the file of this patent
UNITED STATES PATENTS

| | | |
|---|---|---|
| 2,255,313 | Ellis | Sept. 9, 1941 |
| 2,333,639 | Christ et al. | Nov. 9, 1943 |
| 2,533,455 | Hagemeyer | Dec. 12, 1950 |
| 2,609,353 | Rubens et al. | Sept. 2, 1952 |
| 2,617,779 | Griffith et al. | Nov. 11, 1952 |
| 2,773,092 | Carley et al. | Dec. 4, 1956 |
| 2,780,613 | Rubens et al. | Feb. 5, 1957 |
| 2,790,002 | Frank et al. | Apr. 23, 1957 |
| 2,795,625 | Nobis et al. | June 11, 1957 |
| 2,822,349 | Muller et al. | Feb. 4, 1958 |

OTHER REFERENCES

Ellis: "Chemistry of Synthetic Resins," volume 2, published by Reinhold Publishing Corp., New York (1935), pages 891–893.